US010472269B2

(12) United States Patent
Gallagher et al.

(10) Patent No.: US 10,472,269 B2
(45) Date of Patent: Nov. 12, 2019

(54) OVERFLOW DOWNDRAW GLASS TUBE FORMING APPARATUS

(71) Applicant: Corning Incorporated, Corning, NY (US)

(72) Inventors: Michael Thomas Gallagher, Painted Post, NY (US); Patrick Joseph Cimo, Corning, NY (US); Nicholas Ryan Wheeler, Corning, NY (US); Frank Coppola, Horseheads, NY (US); Irene Mona Peterson, Elmira Heights, NY (US); Richard Curwood Peterson, Elmira Heights, NY (US); Olus Naili Boratav, Ithaca, NY (US); George Clinton Shay, Hardy, VA (US); Paul D Albee, Hammondsport, NY (US); Laurent Joubaud, Paris (FR); Antoine Gaston Denis Bisson, Corning, NY (US); Glen Bennett Cook, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 154 days.

(21) Appl. No.: 15/508,160

(22) PCT Filed: Sep. 3, 2015

(86) PCT No.: PCT/US2015/048282
§ 371 (c)(1),
(2) Date: Mar. 2, 2017

(87) PCT Pub. No.: WO2016/036928
PCT Pub. Date: Mar. 10, 2016

(65) Prior Publication Data
US 2017/0283296 A1    Oct. 5, 2017

Related U.S. Application Data

(60) Provisional application No. 62/045,114, filed on Sep. 3, 2014.

(51) Int. Cl.
*C03B 17/02* (2006.01)
*C03B 17/04* (2006.01)

(52) U.S. Cl.
CPC ............ *C03B 17/025* (2013.01); *C03B 17/04* (2013.01); *C03B 17/02* (2013.01)

(58) Field of Classification Search
CPC ........ C03B 17/025; C03B 17/04; C03B 17/02
See application file for complete search history.

(56) References Cited

U.S. PATENT DOCUMENTS 2,433,116 A * 12/1947 Greenbowe ............... B05B 5/12
                                                         250/488.1
3,338,696 A    8/1967 Dockerty
(Continued)

FOREIGN PATENT DOCUMENTS

CN         2059160 U     7/1990
CN       101839574 A     9/2010
(Continued)

OTHER PUBLICATIONS

PCT/US2015/048282 Search Report dated Dec. 1, 2015.
English Translation of CN201580047475.9 First Office Action dated Mar. 25, 2019, China Patent Office, 11 pgs.

*Primary Examiner* — Queenie S Dehghan
(74) *Attorney, Agent, or Firm* — Gregory V. Bean

(57) ABSTRACT

An apparatus for forming glass tubing is described. The apparatus for forming glass tubing comprises an endless former with an outer surface and an inner passage defining an inner surface. The apparatus for forming glass tubing further comprises two chambers from which molten glass
(Continued)

may flow. One chamber flows molten glass to the outer surface of the endless former and another chamber flows molten glass to the inner surface of the endless former. The two flows of molten glass meet at the bottom of the former to form glass tubing.

8 Claims, 12 Drawing Sheets

(56) References Cited

U.S. PATENT DOCUMENTS

| | | |
|---|---|---|
| 3,437,470 A | 4/1969 | Overman |
| 3,578,428 A | 5/1971 | Lee |
| 3,682,609 A | 8/1972 | Dockerty |
| 4,525,194 A | 6/1985 | Rudoi |
| 5,364,432 A | 11/1994 | Leber |
| 8,028,544 B2 | 10/2011 | McIntosh |
| 2006/0260360 A1 | 11/2006 | Dick et al. |
| 2015/0197442 A1 | 7/2015 | Bisson et al. |

FOREIGN PATENT DOCUMENTS

| | | |
|---|---|---|
| GB | 855393 | 6/1959 |
| JP | 2004014326 A | 1/2004 |
| JP | 2004303585 A | 10/2004 |

* cited by examiner

OVERFLOW DOWNDRAW GLASS TUBE FORMING APPARATUS

This application claims the benefit of priority under 35 U.S.C. § 365 of International Patent Application Serial No. PCT/US15/48282 filed on Sep. 3$^{rd}$ 2015, designating the United States of America the content of which is relied upon and incorporated herein by reference in its entirety. International Patent Application Serial No. PCT/US15/48282 claims the benefit of priority under 35 U.S.C. § 119 of U.S. Provisional Application Ser. No. 62/045,114, filed on Sep. 3, 2014, the content of each are relied upon and incorporated herein by reference in their entirety.

BACKGROUND OF THE INVENTION

The present disclosure relates generally to the manufacture of fused glass tubing, and, more particularly, to fused glass tubing formed from an overflow process.

During glass forming, when surfaces are touched by tooling, as is typical in current fabrication methods, the surface becomes damaged. When viewed by the unaided eye, these damages are visible as optical distortions. Additionally, these defects are easily viewed as dark lines when observed via Xenon shadowgraph. Damaged surfaces are undesirable for applications which require the highest optical quality, similar to that which is achieved with fusion-formed glass. In addition, defects caused by tooling can decrease the strength and reliability of a tube.

BRIEF SUMMARY OF THE INVENTION

One embodiment of the present disclosure is an apparatus for forming glass tubing that includes an endless former with an outside surface and an inside surface. The former is "endless" because it comprises a ring or other closed circuit structure with no beginning or end. Molten glass may flow along both the outside and inside surfaces to meet at the bottom of the glass former to form fused glass tubing. The apparatus includes at least two sources that supply the molten glass for flowing over the outside and inside surfaces.

In another embodiment of the present disclosure, the apparatus for forming glass tubing may include a third source that supplies the molten glass. In such an embodiment, two different layers of molten glass may flow along the inside wall of the former to meet with a third layer flowing along the outside wall of the former to form three-layer fused glass tubing.

In another embodiment of the present disclosure, the apparatus for forming glass tubing may include more than two sources that supply molten glass to the former. An example embodiment under this aspect could comprise a third source that supplies the molten glass. In such an embodiment, two different layers of molten glass may flow along the outside wall of the former to meet with a third layer flowing along the inside wall of the former to form three-layer fused glass tubing. Alternatively, in such an embodiment, two layers of molten glass may flow along the inside wall of the former and meet a third layer flowing along the outside wall of the former to form a three-layer fused glass structure. In fact, the apparatuses and processes described herein could be generalize to n sources that supply molten glass to the exterior of the former and provide n layers of molten glass flowing on the exterior of the former and m sources that supply molten glass to the interior of the former and provide m layers of molten glass flowing on the interior of the former to form an n+m layered glass structure at the bottom of the former.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION OF THE INVENTION

Figure 1:
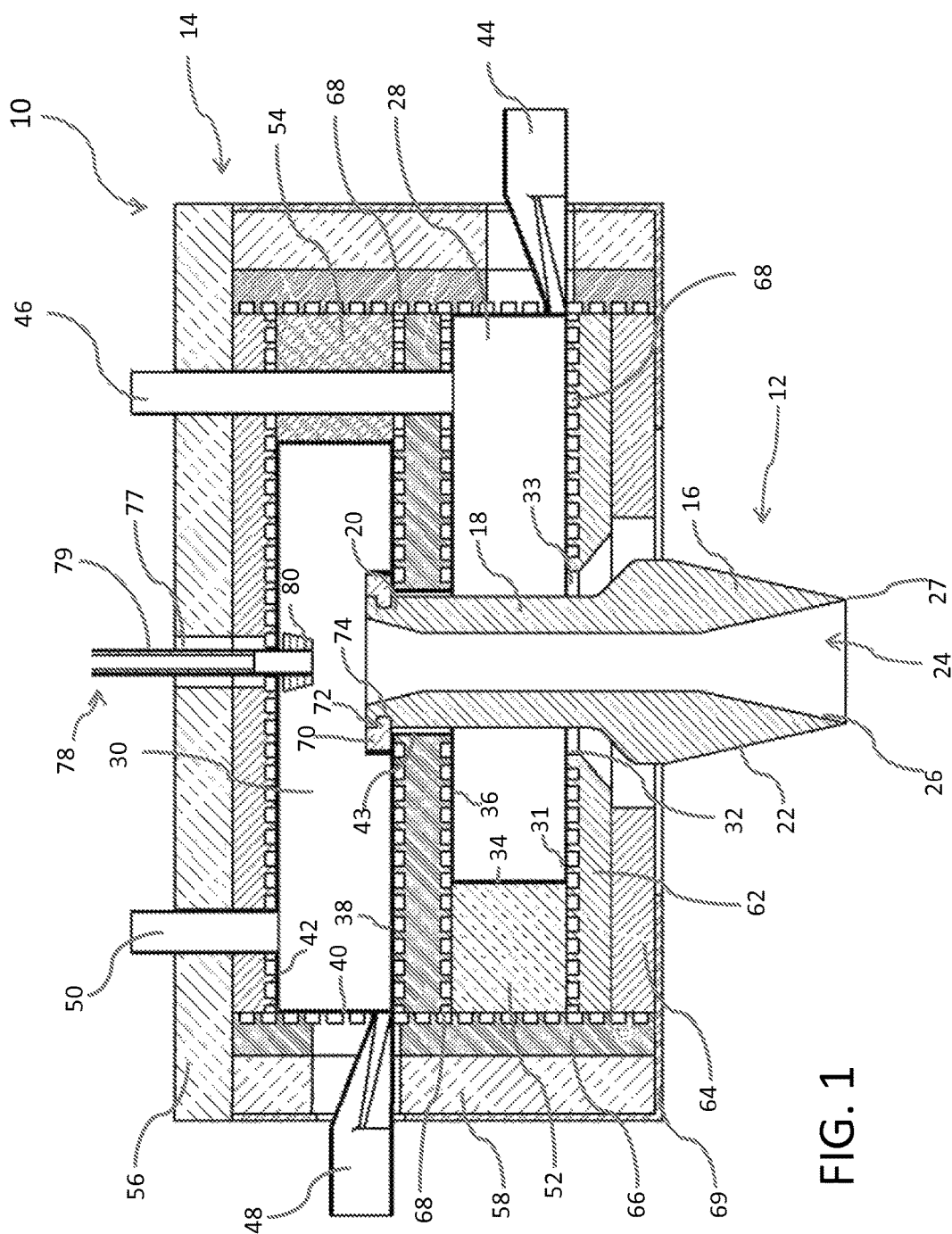
FIG. 1 is an elevated cross-sectional side view of one embodiment of a fused glass tube forming apparatus of the present disclosure.

Reference will now be made in detail to embodiments of the present disclosure, examples of which are illustrated in the accompanying drawings. Whenever possible, the same reference numerals will be used throughout the drawings to refer to the same or like parts.

FIG. 1 is an elevated cross-sectional side view of one embodiment of a fused glass tube forming apparatus of the present disclosure. The apparatus for forming glass tubing 10 includes an endless former 12 and a molten glass hold 14. The endless former 12 is referred to as endless because it comprises a closed circuit, such as a circular ring, but may also be of a different shape, such as rectangular or square. As will be evident from the disclosure below, the shape of the endless former 12 generally defines the shape of the resulting fused glass tube made by the apparatus for forming glass tubing 10.

The endless former 12 has a lower portion 16, a middle portion 18 and an upper portion 20. The endless former 12 also has an outer surface 22 and an inner passage 24 that defines an inner surface 26. As depicted in FIG. 1, the lower portion 16 of the endless former is generally wedge-shaped with both the outer surface 22 and the inner surface 26 sloped toward each other to define a taper with a bottom 27. The taper of the lower portion 16 is not limited to the configuration depicted in FIG. 1. For example, the wedge of the lower portion 16 could result from the outer surface 22 alone sloping toward the inner surface 26, or the inner surface 26 alone sloping toward the outer surface 22. As explained in further detain below, the shape and dimensions of the wedge-shaped portion may vary depending on the glass composition to be formed or other considerations, such as tube thickness, tube shape, thermal constraints and environmental conditions.

The outer surface 22 of the endless former 12 provides a surface along which molten glass may flow to the bottom 27. Similarly, the inner surface 26 provides a surface along which molten glass may flow towards the bottom 27. The flowing molten glass along the outer surface 22 and along the inner surface 26 will meet at the bottom 27 thereby forming fused glass tubing. As already mentioned, the cross section of the fused glass tubing formed by the endless former 12 will depend on the shape of the endless former 12.

The molten glass hold 14 has a lower chamber 28 and an upper chamber 30.

The lower chamber 28 has a lower chamber floor 31 with an opening 32. The opening 32 is configured to allow positioning of the endless former 12. The arrangement of the endless former 12 positioned in the opening 32 of the floor 31 defines a glass flow gap 33. The lower chamber 28 also includes a side wall 34 and a ceiling 36. Molten glass may be fed to the lower chamber 28 through the molten glass feed 44. The floor 31 of the lower chamber 28 is configured to promote flow of the molten glass from the molten glass feed 44 to the glass flow gap 33 such that the molten glass will flow evenly through the glass flow gap 33. As will be described in more detail below, the lower chamber 28 may be provided with any number of means for regulating the flow of molten glass to promote proper and even flow.

The upper chamber 30 of the molten glass hold 14 is of a construction similar to that of the lower chamber 28. The upper chamber 30 has a floor 38, a side wall 40 and a ceiling 42. The floor 38 of the upper chamber 30 includes an opening 43 to accommodate the upper portion 20 of the endless former 12. The endless former 12 may be positioned within the opening 43 such that the upper portion 20 extends above the floor 38 of the upper chamber 30. The upper portion may be provided with an indent 74 so that a retention ring 70 with a foot 72 may fix the endless former in position within the opening 43 of the upper chamber floor 38 and within the opening 32 of the lower chamber floor 31.

Molten glass may flow into the upper chamber 30 through the molten glass feed 48. The floor 38 of the upper chamber 30 is configured to promote even flow of the molten glass towards the opening 43 in the floor 38 and the retention ring 70. In the configuration shown in FIG. 1 the molten glass will flow from the molten glass feed 48 into the upper chamber 30 towards the retention ring 70. The retention ring 70 will serve as a dam regulating the flow of molten glass such that the molten glass must rise to the level of the height of the retention ring 70 before the molten glass may flow over the retainer ring and into the inner passage 24 of the endless former 12.

The molten glass may then flow down along the inner surface 26 towards the bottom 27 of endless former 12. The film (alternatively described as a layer or coating)of molten glass flowing down along the inner surface 26 of the endless former will meet and fuse with the flow of molten glass from the lower chamber 28 and flowing down the outer surface 22 of the endless former 12. The flow of molten glass flowing on the inner surface 26 will provide the inner surface of the fused glass tubing while the molten glass flowing downwardly on the outer surface 22 will provide the outer surface of the fused glass tubing. The resulting fused glass tubing will have pristine inner and outer surfaces as a result of being formed free from contact with any surfaces, tools, or other devices.

A vent 46 may be connected to the lower chamber 28 and a vent 50 may be connected to the upper chamber 30 to vent gases when molten glass flows into the lower chamber 28 and upper chamber 30, respectively.

As shown in FIG. 1, the molten glass hold 14 comprises a number of insulating components to prevent unwanted cooling of the molten glass. The molten glass hold may include ceramic bricks 52, 54, as well as ceramic boards 56, 58, 60, 62, 64, 66. These insulating components are standard in the industry and any combination of insulating components is contemplated in the present disclosure.

The floor 31, the side wall 34 and the ceiling 36 of the lower chamber 28 and the floor 38 side wall 40 and ceiling 42 of the upper chamber 30 should be made of materials typically used in the production of glass, for example, platinum or ceramic, e.g., zircon or silicon nitride. Similarly, the retention ring 70 and the endless former 12 should be made of materials typically used in molten glass applications, for example, platinum or ceramic e.g., zircon or silicon nitride (see, e.g., U.S. Pat. Nos. 3,338,696, 3,437, 470, 3,682,609, and 8,028,544, all of which are herein incorporated by reference in their entireties). The lower chamber 28 and upper chamber 30 may be heated by any means known in the art, such as convection, conduction, radiation, or advection. For example, the lower chamber 28 and upper chamber 30 may be heated via heating wire or coil 68, optionally made of platinum.

FIG. 1 shows lower chamber 28 capable of being heated on all sides with heating wire or coil 68 along the entire floor 31, side wall 34, and ceiling 36. Similarly, the upper chamber 30 is lined with heating wire or coil 68 along the entire length of the floor 38, side wall 40 and ceiling 42. The heating generated by the heating wire or coil 68 may be regulated from one area of the lower chamber 28 to another creating heat gradients which may also assist in regulating the flow of the molten glass through the chamber 28 to the glass flow gap 33. Similarly, a heating wire or coil 68 may be regulated from one area to another in the upper chamber 30 creating heat gradients in the upper chamber 30 and regulating the flow of molten glass through that chamber 30 as well.

The ceiling 42 of the upper chamber 30 may be provided with an opening 77 to accommodate a plunger 78 comprises a rod 79 and a bell 80. The rod 79 is vertically adjustable such that the bell 80 may be lowered into the inner passage 24 of the endless former 12 at the upper portion 20 to regulate flow of molten glass into the inner passage 24 of the endless former 12.

Figure 2:
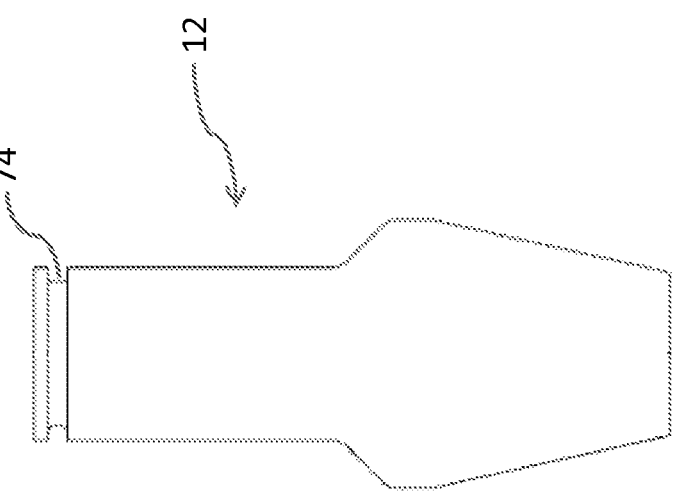
FIG. 2 is an elevated view of a former for use in one embodiment of the present disclosure.

FIG. 2 is an elevated view of a former for use in one embodiment of the present disclosure. The former 12 as shown in FIG. 2 corresponds to the embodiment shown in FIG. 1. Specifically, the former 12 includes an indent 74, which cooperates with the retention ring 70 (FIG. 1) to fix the former 12 within the apparatus for forming glass tubing 10.

Figure 3:
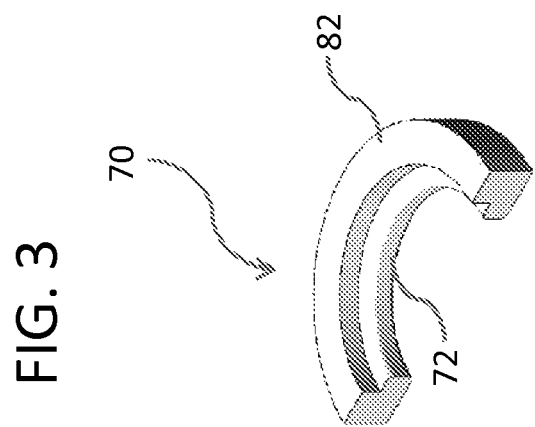
FIG. 3 is a perspective view of a portion of a retention ring for use in one embodiment of the present disclosure.

FIG. 3 is a perspective view of a portion of the retention ring 70. The retention ring 70 includes the foot 72 and an upper extension 82. The foot 72 is configured to engage the indent 74 of the former 12 (FIG. 2). When the former 12 is positioned within the apparatus for forming glass tubing 10 with the foot 72 of the ring 70 engaging the indent 74, the former 12 is fixed in place within the apparatus 10, as shown in FIG. 1.

Figure 4:
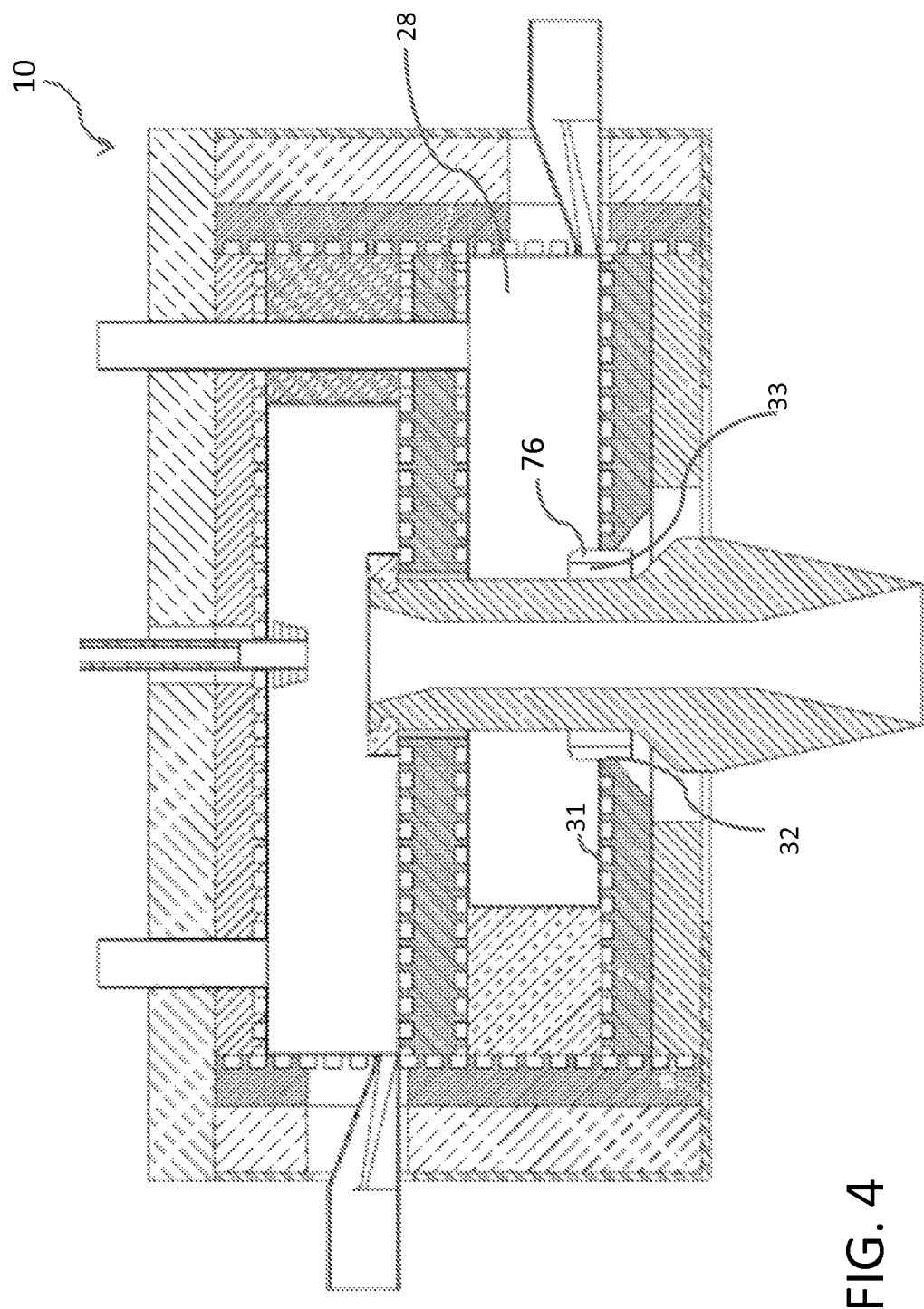
FIG. 4 is an elevated cross-sectional side view of one embodiment of a fused glass tube forming apparatus of the present disclosure.

FIG. 4 is an elevated cross-sectional view of one embodiment of the present disclosure. The apparatus for forming glass tubing 10 shown in FIG. 4 is the same apparatus shown in FIG. 1 with a ring 76 placed in the opening 32 of the floor 31 of the lower chamber 28. The ring 76 is conventionally made of platinum but may be made of any material conventionally used in processing molten glass. The ring 76 will serve as a dam regulating the flow of molten glass such that the molten glass must rise to the level of the height of the ring 76 before the molten glass may flow over the ring 76 and into the glass flow gap 33.

Figure 5:
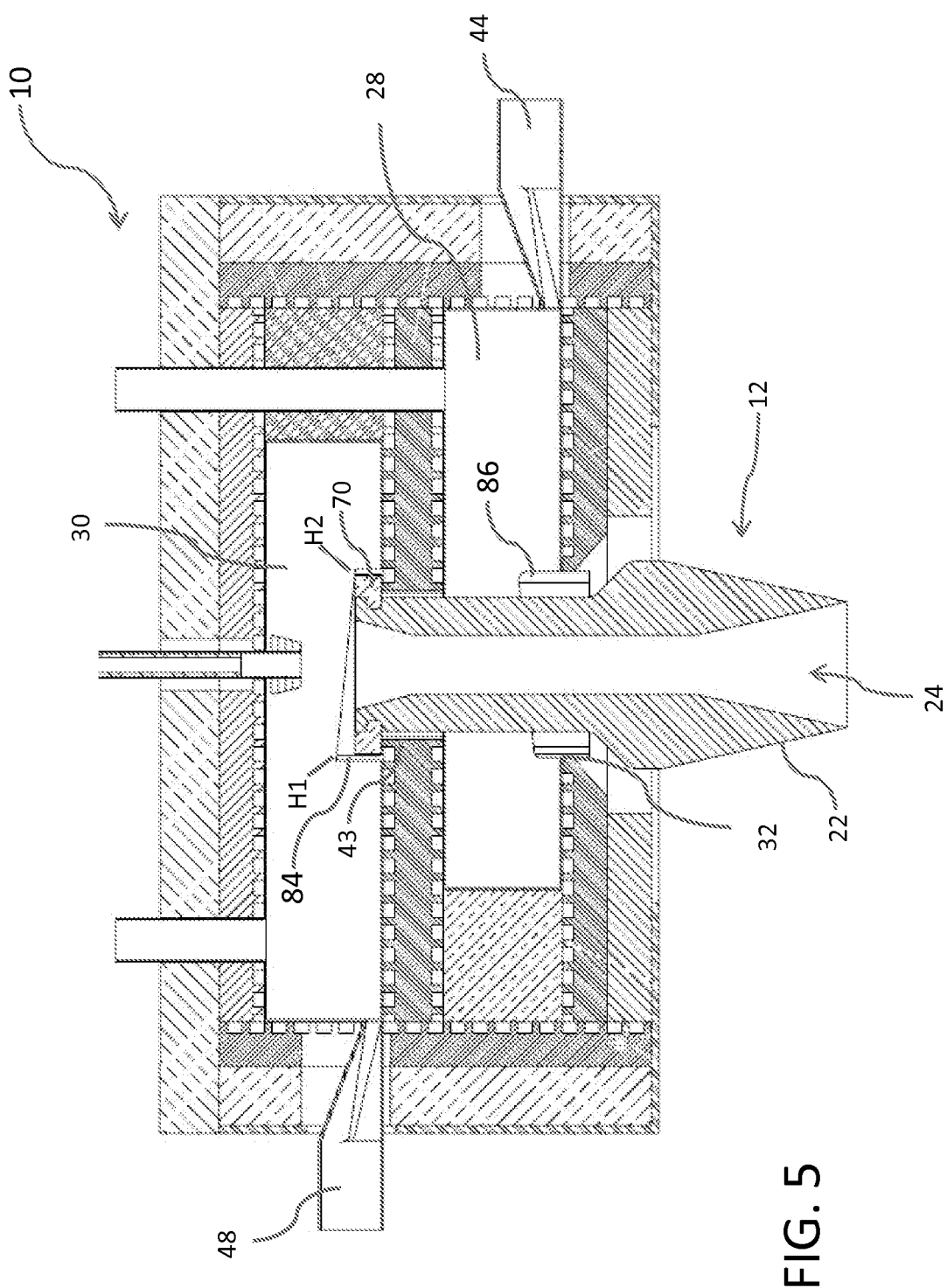
FIG. 5 is an elevated cross-sectional side view of one embodiment of a fused glass tube forming apparatus of the present disclosure.

FIG. 5 is an elevated cross-sectional view of one embodiment of the present disclosure. The apparatus for forming glass tubing 10 shown in FIG. 5 is the same apparatus shown in FIG. 1 with a contoured dam 84 placed adjacent the retention ring 70 in the upper chamber 30. The contoured dam 84 includes an increased height H1 and a decreased height H2. The contoured dam 84 is designed with the depicted height variation in order to regulate the flow of molten glass from the glass inlet 48 to the opening 43 in the floor 38. The flow of molten glass from the glass feed 48 may require regulation through means such as the contoured dam 84 in order to ensure proper and even flow into the inner passage 24 of the former 12. The increased height H1 is adjacent to the glass feed 48 to account for the greater volume of molten glass present on the feed side of the upper chamber 30. The shape of the upper surface of the contoured dam 84 in transitioning from height H1 to height H2 is determined by the desired flow properties, and may take on a linear or nonlinear shape when viewed in elevated cross-section (i.e., as shown in FIG. 5).

The apparatus 10 of FIG. 5 also differs from FIG. 1 in that it includes a second contoured dam 86 at the opening 32 of the lower chamber 28 similar to the contoured dam 84 of the upper chamber 30, the contoured dam 86 of the lower chamber 28 includes a varying height in order to regulate the flow of molten glass from the glass feed 44 to the opening 32. Such a contoured dam 86 may be required to regulate the flow of molten glass from the feed 44 to the opening 32 in order to ensure even flow of the molten glass through the opening 32 onto the outer surface 22 of the former 12. As in the case of contoured dam 84, the shape of the upper surface of the contoured dam 86 is determined by the desired flow properties, and may take on a linear or nonlinear shape when viewed in elevated cross-section (i.e., as shown in FIG. 5).

Figure 6:
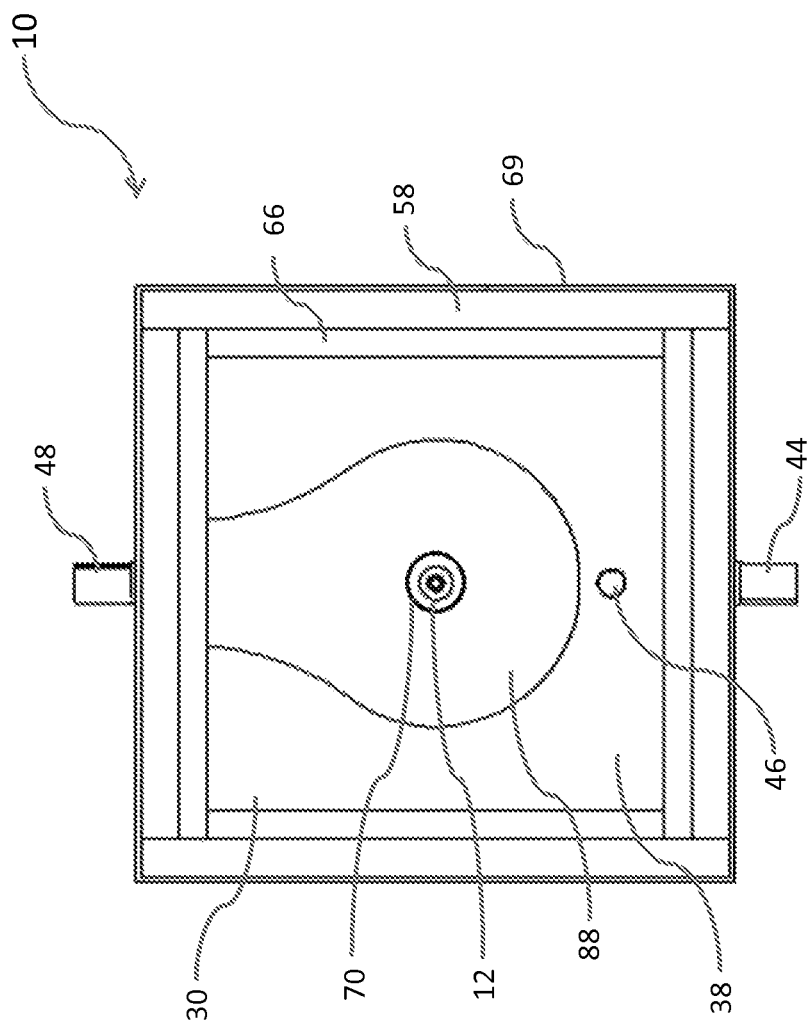
FIG. 6 is an elevated cross-sectional top view of one embodiment of a fused glass tube forming apparatus of the present disclosure.

FIG. 6 is an elevated cross-sectional top view of one embodiment of the present disclosure. The cross sectional view shown in FIG. 6 is through the upper chamber 30. The general construction of an acceptable side wall for the apparatus 10 is shown including the ceramic board 66, the ceramic board 58, and the stainless steel casing 69. Also shown are the glass feed 44 for the lower chamber and the glass feed 48 for the upper chamber. The ceramic brick 54 shown in FIG. 1 is not shown in order to show the complete floor 38.

The floor 38 of the upper chamber 30 may include a bowl 88 (not shown in FIG. 1), which may be further utilized to regulate the flow of molten glass from glass feed 48 to the retention ring 70 and the former 12. The floor 38 including the bowl 88 may be made of ceramic. Alternatively, the bowl 88 may be separately made of platinum. If the bowl 88 is made of platinum, the bowl 88 may be heated to further regulate the flow of molten glass from the glass feed 48 to the retainer ring 70.

The embodiments of FIGS. 7-13 are simplified versions of the embodiments of FIG. 1-6. As is readily apparent, many of the features and details described in connection with FIGS. 1-6 are equally applicable to the embodiments of FIGS. 7-13.

Figure 7:
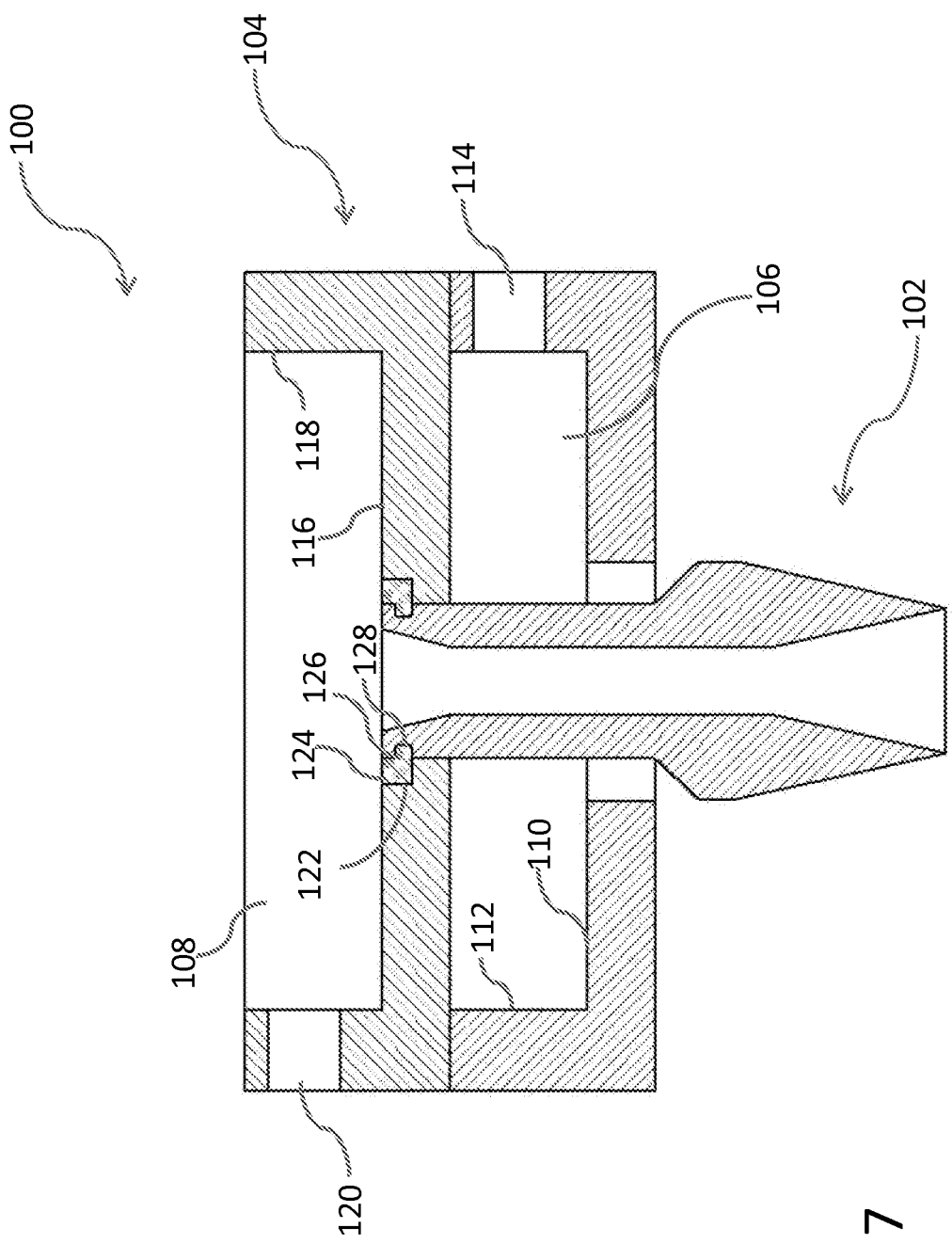
FIG. 7 is an elevated cross-sectional side view of one embodiment of a fused glass tube forming apparatus of the present disclosure.

FIG. 7 is an elevated cross-sectional view of one embodiment of the present disclosure. The apparatus for forming glass tubing 100 is shown in a simplified version and includes an endless former 102 and a molten glass hold 104. The molten glass hold 104 has a lower chamber 106 and an upper chamber 108. The lower chamber 106 has a floor 110, a side wall 112 and a glass feed 114. The upper chamber 108 has a floor 116, a side wall 118, and a glass feed 120.

FIG. 7 shows a variation on the manner in which the former 102 is fixed in place. The floor 116 of the upper chamber 108 includes a recess 122. The recess is configured to accommodate a retention ring 124 that includes a foot 126. The foot 126 engages an indent 128 in the former 102.

Figure 8:
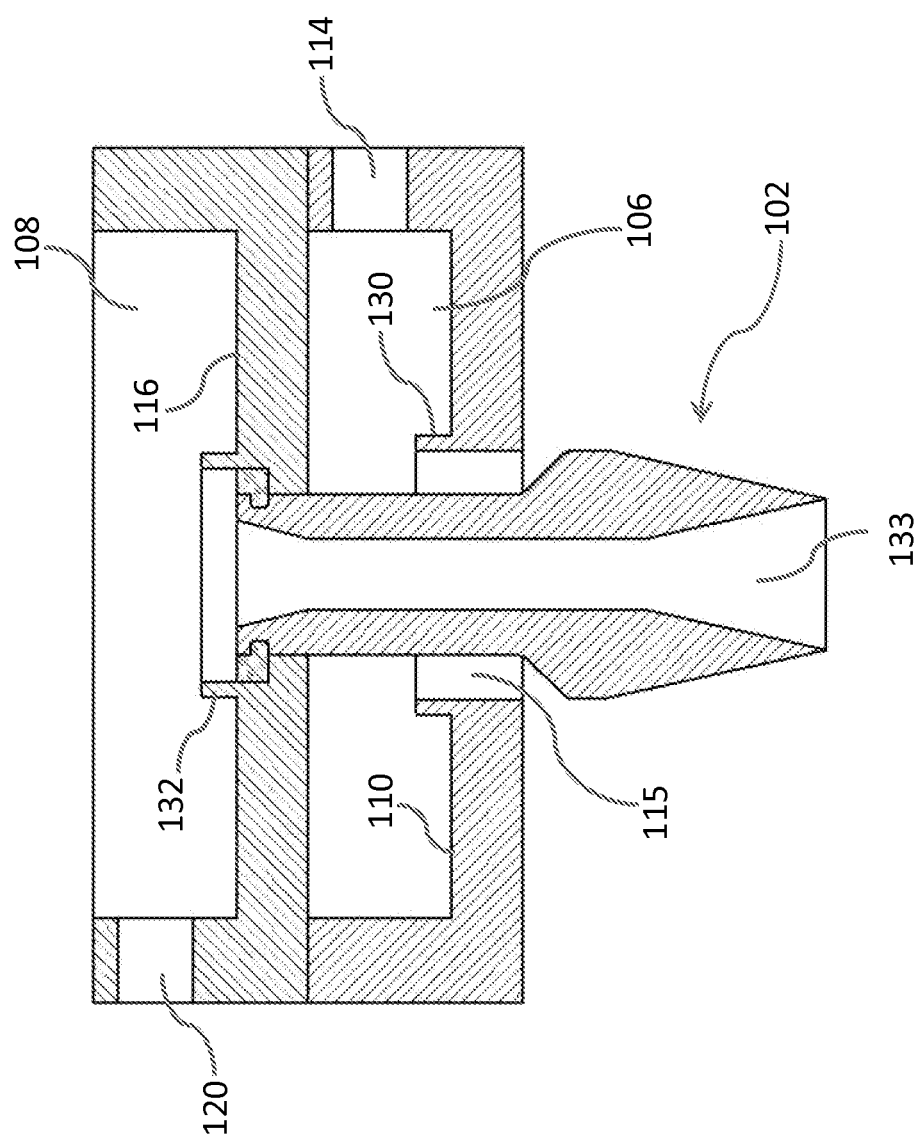
FIG. 8 is an elevated cross-sectional side view of one embodiment of a fused glass tube forming apparatus of the present disclosure.

FIG. 8 is an elevated cross-sectional side view of one embodiment of the present disclosure. FIG. 8 is similar to the embodiment of FIG. 7 except that the floor 110 of the lower chamber 106 is provided with a dam 130 and the floor 116 of the upper chamber 108 is provided with a dam 132. The dam 130 in the lower chamber 106 regulates the flow of molten glass from the glass feed 114 to effect a more uniform flow of glass into the glass flow gap 115 defined between the floor 110 of the lower chamber 106 and the former 102. Similarly, the dam 132 regulates the flow of molten glass from the glass feed 120 to effect a more uniform flow of glass over the dam 132 and into the inner passage 133 of the former 102.

Figure 9:
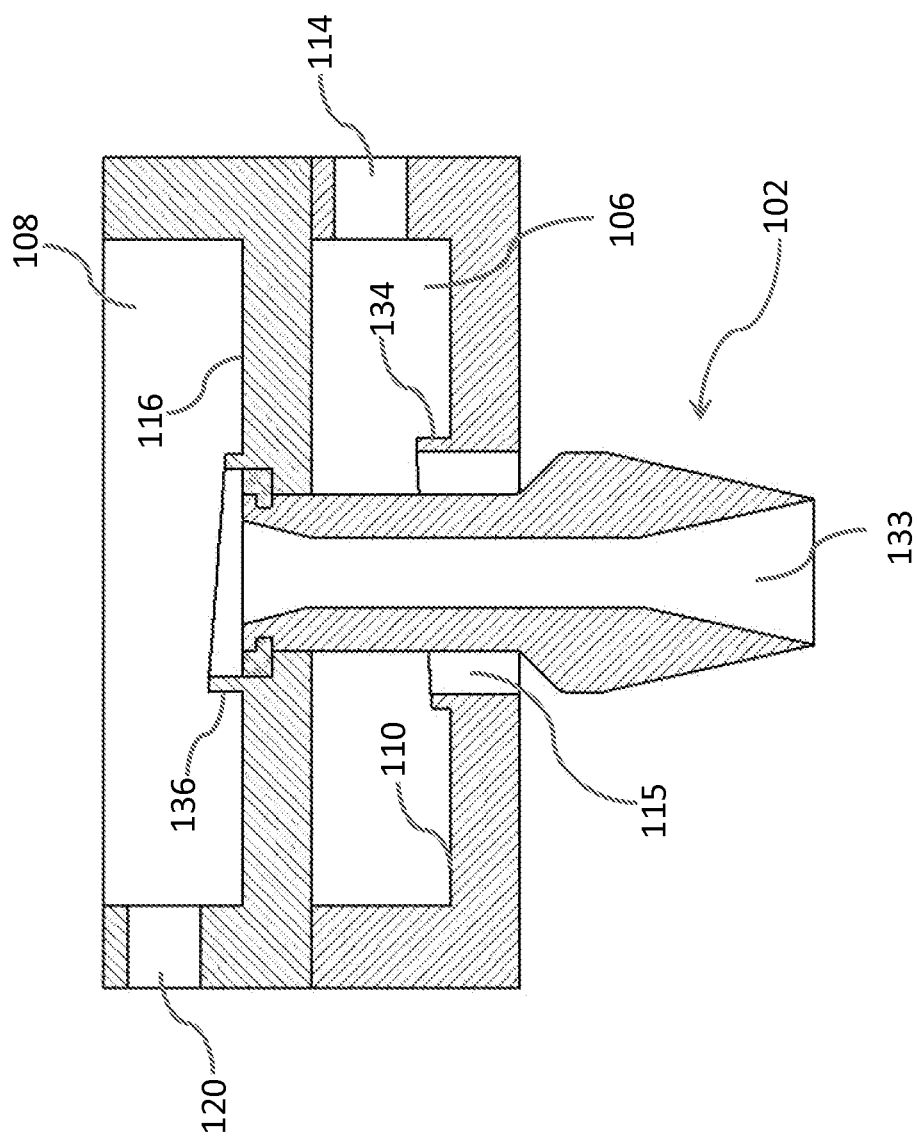
FIG. 9 is an elevated cross-sectional side view of one embodiment of a fused glass tube forming apparatus of the present disclosure.

FIG. 9 is an elevated cross-sectional side view of one embodiment of the present disclosure. FIG. 9 shows the floor 110 of the lower chamber 106 with a contoured dam 134. The contoured dam provides additional regulation of the flow of molten glass from the glass feed 114 to the glass flow gap 115. The contoured dam 134 has a greater height adjacent the glass feed 115 to account for the greater volume of molten glass adjacent the glass feed 114. The contoured dam 134 is designed to provide a more even flow from the second chamber 106 into the glass flow gap 115. The increased height adjacent the glass feed 114 accounts for the greater volume of molten glass present on the feed side of the lower chamber 106.

The contoured dam 136 similarly regulates the flow of glass in the upper chamber 108 from the glass feed 120 to the inner passage 133 of the former 102. The increased height adjacent to the glass feed 120 accounts for the greater volume of molten glass present on the feed side of the upper chamber 108.

Figure 10:
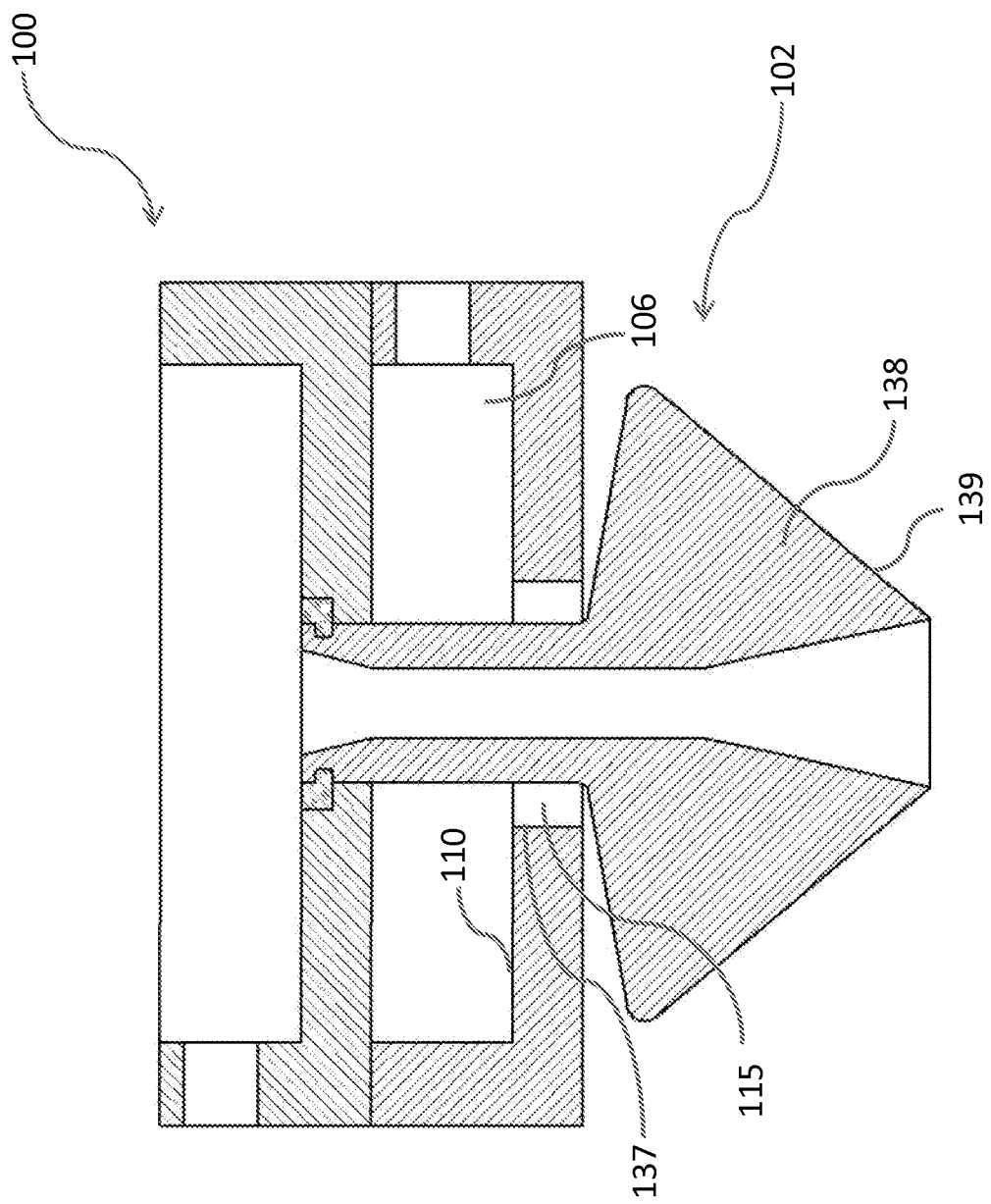
FIG. 10 is an elevated cross-sectional side view of one embodiment of a fused glass tube forming apparatus of the present disclosure.

FIG. 10 is an elevated cross-sectional side view of one embodiment of the present disclosure. FIG. 10 shows an alternative embodiment for the former 102. The former 102 includes a wide wedge portion 138. The wide wedge portion 138 is designed to increase the outer surface 139 of the former 102. It is known that flowing molten glass requires time to heal after the glass surface has been in contact with tooling or other surfaces. As shown in the apparatus of FIG. 10, molten glass flowing from the lower chamber 106 will be in contact with the floor 110 and also with the outer boundary 137 of the glass flow gap 115. The outer surface of the glass tubing formed by the apparatus for forming glass tubing 100 will potentially have been in direct contact with the floor 110 of the lower chamber 106 as well as the outside boundary 137 of the glass flow gap 115. In order to form glass tubing with a pristine outer surface, the outer surface of the molten glass flowing along the outer surface 139 of the former 102 must be provided sufficient time to heal. The widened wedge portion of the former 102 is intended to provide that healing time to the outer surface of the flowing molten glass. The time required for the outer surface of the flowing molten glass to heal will vary depending on the type of glass that is being used, including its viscosity and surface tension. Accordingly, different glasses will require different healing times, including different distances to travel along the outer surface 139 of the former 102.

Figure 11:
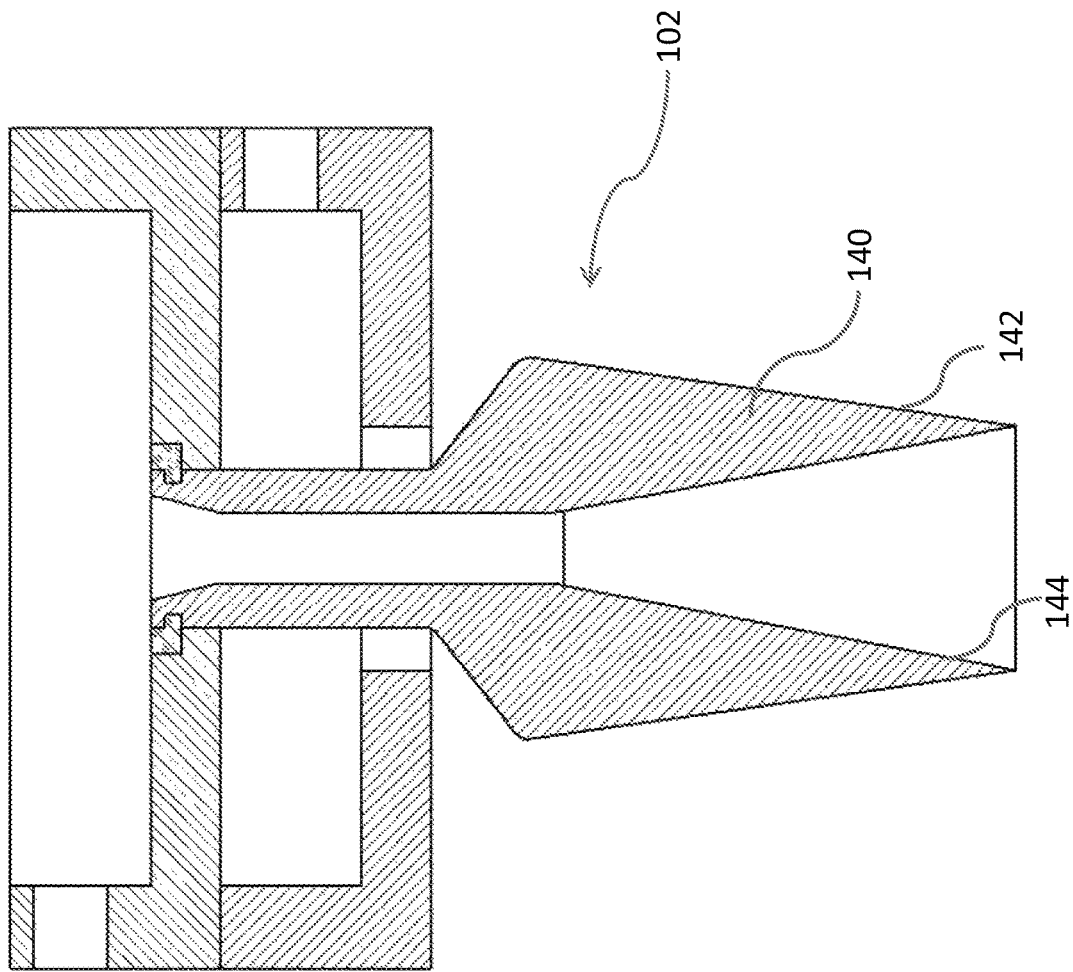
FIG. 11 is an elevated cross-sectional side view of one embodiment of a fused glass tube forming apparatus of the present disclosure.

FIG. 11 is an elevated cross-sectional side view of one embodiment of the present disclosure. FIG. 11 shows a former 102 with a long wedge portion 140. The long wedge portion 140 increases the outer surface 142 to provide sufficient healing time to the molten glass flowing along the outer surface 142. Similarly, the long wedge portion increases the inner surface 144 to provide sufficient healing time to the molten glass flowing along the inner surface 144. As a result of increasing the length traveled along the outer surface 142 and the inner surface 144 the former 102 with its long wedge portion 140 increases the time for both molten glass flows to heal and thus result in a fused glass tube having pristine inner and outer surfaces.

Figure 12:
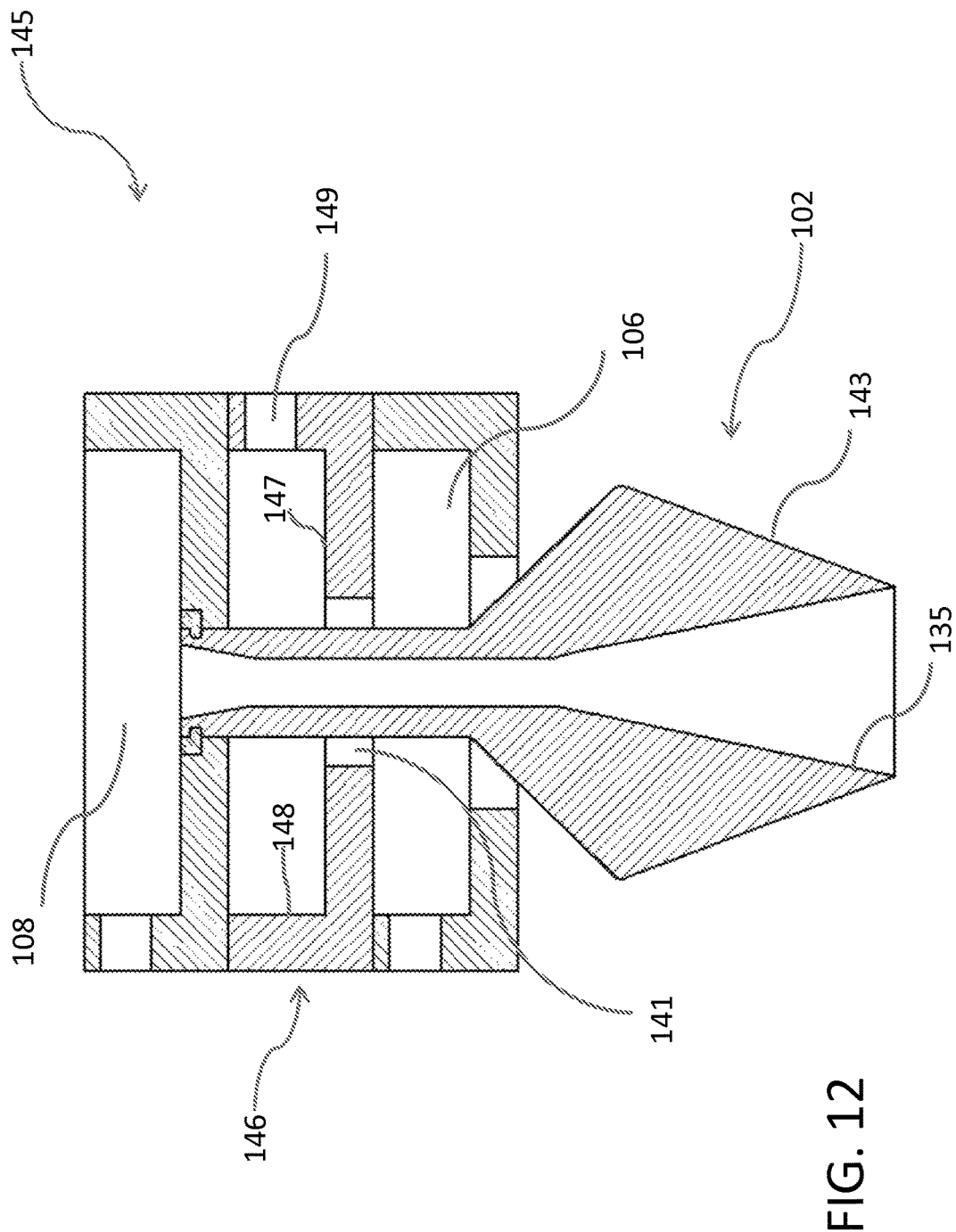
FIG. 12 is an elevated cross-sectional side view of one embodiment of a fused glass tube forming apparatus of the present disclosure.

FIG. 12 is an elevated cross-sectional side view of one embodiment of the present disclosure. The apparatus for forming glass tubing 145 is similar to that of FIG. 7 and includes a lower chamber 106 and an upper chamber 108. The lower chamber 106 and the upper chamber 108 are as described above in connection with FIG. 7 through 11. The former 102 is as described in connection with FIGS. 7 through 11. In addition, the apparatus for forming glass tubing 145 includes a middle chamber 146. The middle chamber 146 has a floor 147, a side wall 148 and a glass feed 149. The floor 147 includes an opening 141. The opening 141 is configured to accommodate the former 102. Molten glass may flow from the glass feed 149 toward the opening 141. Any of the means already described for regulating the flow of the molten glass may be used with the middle chamber 146.

The molten glass from the middle chamber 146 will flow down along the outer surface 143 of the former 102. Molten glass from the lower chamber 106 may also flow onto the outer surface 143 as a layer over the layer of molten glass from the middle chamber. Molten glass from the upper chamber 108 may flow down along the inner surface 135 of the former 102. The resulting tubing will have three layers with the outside layer formed from the molten glass from the lower chamber 106, the middle layer formed from the molten glass from the middle chamber 146, and the inner layer formed from the molten glass from the upper chamber 108.

Figure 13:
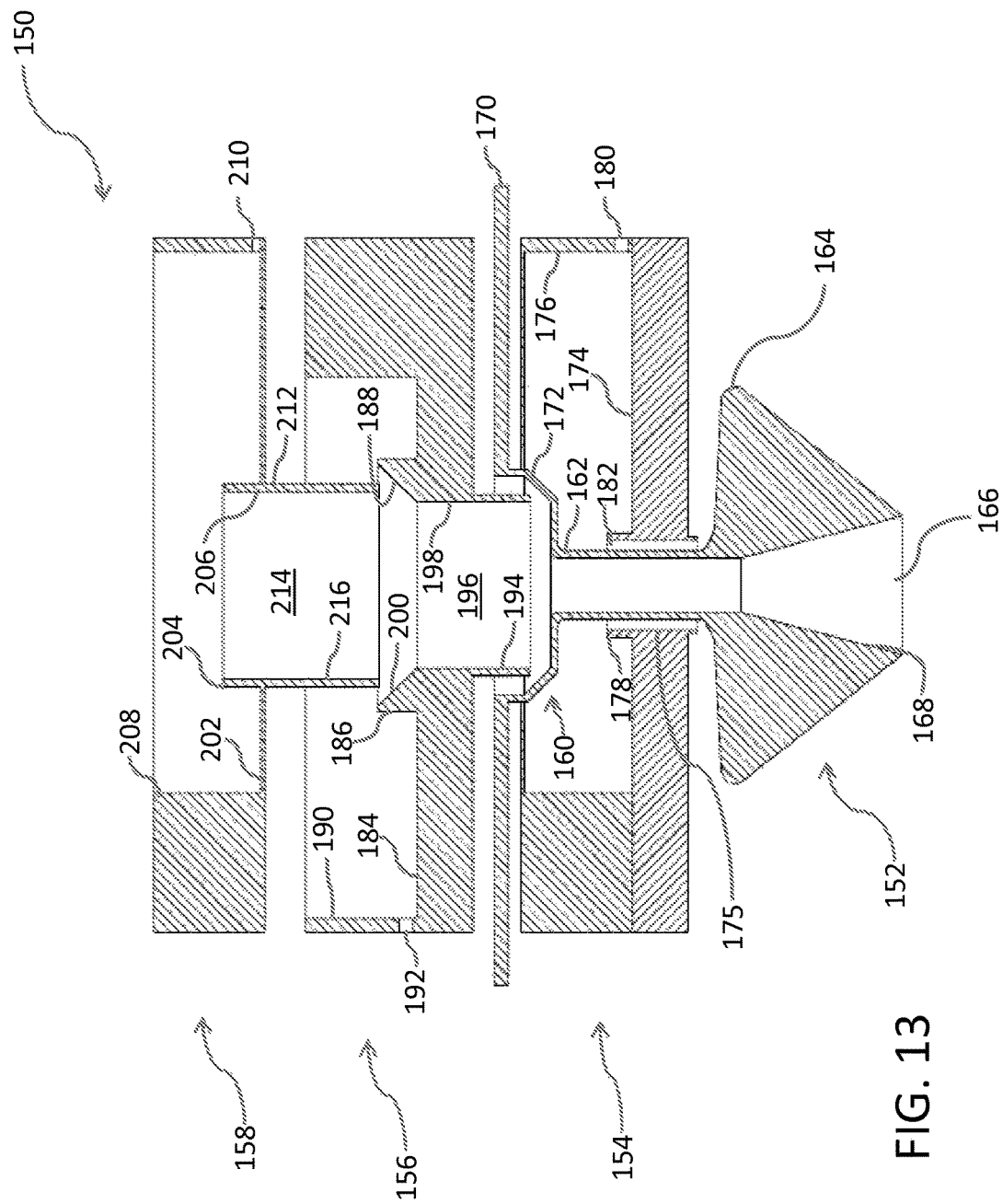
FIG. 13 is an elevated cross-sectional side view of one embodiment of a fused glass tube forming apparatus of the present disclosure.

FIG. 13 is an elevated cross-sectional side view of one embodiment of the present disclosure. The apparatus for forming glass tubing 150 includes an endless former 152, a bottom molten glass hold 154, a middle molten glass hold 156, and an upper molten glass hold 158. The former includes an upper portion 160, an outer surface 162, a lower portion 164, and inner passage 166 with an inner surface 168, and an extension 170. The extension includes a bowl 172. The extension 170 is designed to be fixed so that the position of the former 152 is static.

The bottom molten glass hold 154 includes an insulating floor 174 with an opening 175 in the floor 174, and an insulating wall 176. The floor may also include a dam 178. The bottom molten glass hold 154 includes a glass feed 180. Molten glass may be fed into the bottom molten glass hold 154 through the glass feed 180 such that the molten glass will flow towards the opening 175. The dam 178 serves to regulate the flow of the molten glass into the glass flow gap 182 defined by the second floor 174 and the outer surface 162 of the former 152.

The middle molten glass hold 156 includes an insulating floor 184 that includes a dam 186 and an opening 188, an insulating wall 190, and a molten glass feed 192. The middle molten glass hold 156 may include a neck 194 extending down from the bottom of the floor 184 at the floor opening 188. The opening defines an inner passage 196 with an inner surface 198. The inner surface 198 may include a frustoconical portion 200 at its upper extent.

Molten glass may be fed into the middle molten glass hold 156 through the glass feed 192. The molten glass may flow towards the dam 186. The molten glass may flow over the dam 186 and into the opening 188 so that it flows along the inner surface 198 of the inner passage 196. The molten glass will flow down along the inner surface 198 of the neck 194 until it is free of the neck and flows down into the bowl 172 of the endless former 152. The glass flow from the middle molten glass hold 156 will then continue to flow down along the inner surface 168 of the endless former 152.

The upper molten glass hold 158 includes an insulated floor 202 with a dam 204 and an opening 206, an insulating wall 208, and a molten glass feed 210. The upper molten glass hold 158 may also include a neck 212. The opening 206 of the upper molten glass hold 158 defines an inner passage 214 with an inner surface 216. Molten glass may be fed into the upper molten glass hold 158 through the glass feed 210 with the glass flowing towards the dam 204, over the dam 204, into the opening 206 and down along the inner surface 216. When the molten glass flow is free of the inner surface 216, it may flow into the opening 188 of the middle molten glass hold. Preferably, the molten glass flowing from the upper molten glass hold 158 will flow onto the molten glass flowing from the middle molten glass hold 156. The neck 216 of the upper molten glass hold 158 should have an inner diameter that is greater than the inner diameter of the neck 194 of the middle molten glass hold 156, as shown in FIG. 13. In such an arrangement, the molten glass flowing from the upper molten glass hold 158 will flow onto the molten glass flowing from the middle molten glass hold 156 at the frustoconical portion 200 of the opening 188 of the middle molten glass hold. As is evident, any configuration for the opening 188 and the neck 194 of the middle molten glass hold 156 that results in the molten glass flow from the upper molten glass hold 158 being layered onto the molten glass flowing from the middle molten glass hold 156 is acceptable. For example, the entire inner passage 196 may be defined by angled walls such as present in the frusto-conical portion 200.

The bottom molten glass hold 154 may be mounted separately from the endless former 152 such that it may be horizontally adjusted relative to the endless former 152. In this way the flow of molten glass from the glass feed 180 towards the glass flow gap 182 may be regulated to provide the desired flow through the glass flow gap 182 and onto the outer surface 164 of the endless former 152.

Similarly, the middle molten glass hold 156 may be mounted separately from the endless former 152 and the bottom molten glass hold 154 so that it too can be adjusted horizontally relative to the endless former 152 and the bottom molten glass hold 154. Upper molten glass hold 158 may also be separately mounted such that it can be adjusted horizontally relative to each of the endless former 152, the bottom molten glass hold 154, and the middle molten glass hold 156.

The designs shown in FIGS. 12 and 13 can be expanded beyond three layers. By the inclusion of additional holds, the apparatuses shown can be used to form glass structures having 4 or more layers. In another embodiment the apparatus for forming glass tubing may include more than two sources that supply molten glass to the former. In fact, the apparatuses described herein, for example, by generalizing the design shown in FIG. 12, could be used as n sources that supply molten glass to the exterior of the former and provide n layers of molten glass flowing on the exterior of the former. Similarly, it is possible to generalize the design in FIG. 13 to provide m sources that supply molten glass to the interior of the former and provide m layers of molten glass flowing on the interior of the former. The resulting glass structure at the bottom of the former 27 is a multilayered product formed of n+m layers.

The apparatus for forming glass tubing 150 may be altered in numerous ways as described above in connection with FIGS. 7 through 11 to include contoured dams and different shaped formers. As already noted, many of the features of other embodiments are equally applicable to the apparatus for forming glass tubing 150.

In the above embodiments, a number of means for regulating the flow of molten glass have been described. Those means include dams, including extensions, over which molten glass must flow, contoured dams and extensions designed to account for the greater volume of molten glass present on one side of the chamber, contouring the floor, such as with a bowl, of a hold or chamber, temperature regulation of the chamber or floor to create a temperature gradient in the chamber or floor, and tilting or horizontally adjusting the floor. Each of these means for regulating the flow of molten glass may be used separately or together to adjust the flow of molten glass to the desired effect.

It will be apparent to those skilled in the art that various modifications and variations can be made without departing from the spirit and scope of the invention, which is defined by the appended claims. The appended claims make reference to specific structures and may reference structures with an ordinal prefix. The presence of an ordinal prefix should not be understood to require structures with all prior ordinal prefixes. For example, if a claim refers to a third dam, it should not be understood that the claim will also require a second dam. This reference within claims is made to avoid confusion between separately dependent claims.

The invention claimed is:

1. An apparatus for forming glass tubing comprising:
an endless former and a molten glass hold,
wherein the endless former is configured to be positioned substantially vertically and comprises a lower portion, a middle portion, an upper portion, an outer surface and an inner passage with an inner surface;
wherein the molten glass hold has a first floor, the first floor comprises a first opening configured for positioning of the endless former therethrough; and a second floor spaced above the first floor, the second floor comprises a second opening configured to accommodate the endless former;
wherein the molten glass hold is configured to engage the endless former such that the upper portion of the endless former engages the second opening of the second floor to fix the position of the endless former relative to the molten glass hold, the middle portion of the endless former extends between the first and second floors, and the lower portion of the endless former extends through and below the first floor; the endless former together with the first floor define a glass flow gap between the endless former and the first floor of the molten glass hold;
wherein the first floor is configured to permit the flow of molten glass toward the endless former such that the molten glass may pass through the glass flow gap and down along the outer surface of the endless former; and
wherein the second floor is in fluid communication with the inner passage, the second floor is configured to permit the flow of molten glass toward the endless former such that the molten glass may flow down along the inner surface of the inner passage to meet with the glass flow along the outer surface of the endless former to form glass tubing,
wherein the first floor includes a first endless upward extension at the first opening, the first endless upward extension configured to impede the flow of molten glass and to cause the molten glass to flow over the first endless upper extension before passing into the glass flow gap, the first endless upward extension including a non-uniform height configured to impede the flow of molten glass to a greater extent from one direction relative to the flow of molten glass from a different direction.

2. The apparatus for forming glass tubing of claim 1, wherein the lower portion of the endless former includes a bottom and a wedge-shaped portion such that the outer surface and inner surface form a taper and meet at the bottom of the lower portion.

3. The apparatus for forming glass tubing of claim 2, wherein the second floor includes a second endless upward extension adjacent the second opening, the second endless upward extension configured to impede the flow of molten glass and to cause the molten glass to flow over the second endless upper extension before passing into the inner passage to flow down along the inner surface of the inner passage.

4. The apparatus for forming glass tubing of claim 3, wherein the second endless upward extension of the second floor includes a non-uniform height configured to impede the flow of molten glass to a greater extent from one direction relative to the flow of molten glass from a different direction.

5. The apparatus for forming glass tubing of claim 2, wherein the upper portion of the endless former includes a third endless upper extension configured to impede the flow of molten glass and to cause the molten glass to flow over the third endless upper extension before passing into the inner passage to flow down along the inner surface of the inner passage.

6. The apparatus for forming glass tubing of claim 5, wherein the third endless upward extension of the upper portion of the endless former includes a non-uniform height configured to impede the flow of molten glass to a greater extent from one direction relative to the flow of molten glass from a different direction.

7. The apparatus for forming glass tubing of claim 1, wherein the first floor includes a first means for regulating the flow of molten glass and the second floor includes a second means for regulating the flow of molten glass.

8. The apparatus for forming glass tubing of claim 7, wherein the means for regulating the flow of molten glass comprises the first floor including a first endless upward extension configured to impede the flow of molten glass and to cause the molten glass to flow over the first endless upper extension before passing into the glass flow gap, and the second floor or the upper portion of the endless former includes a second endless upper extension configured to impede the flow of molten glass and to cause the molten glass to flow over the second endless upper extension before passing into the inner passage to flow down along the inner surface of the inner passage.

\* \* \* \* \*